DIGITAL DATA DETECTION CIRCUITRY

Filed June 29, 1962 2 Sheets-Sheet 1

INVENTOR.
JAMES E. APPLEQUIST
BY
Walter J. Madden, Jr.
ATTORNEY

United States Patent Office 3,164,815 Patented Jan. 5, 1965

3,164,815

DIGITAL DATA DETECTION CIRCUITRY

James E. Applequist, Los Angeles, Calif., assignor to International Business Machines Corporation, New York, N.Y., a corporation of New York Filed June 29, 1962, Ser. No. 206,426
6 Claims. (Cl. 340—174.1)

Figure 1:
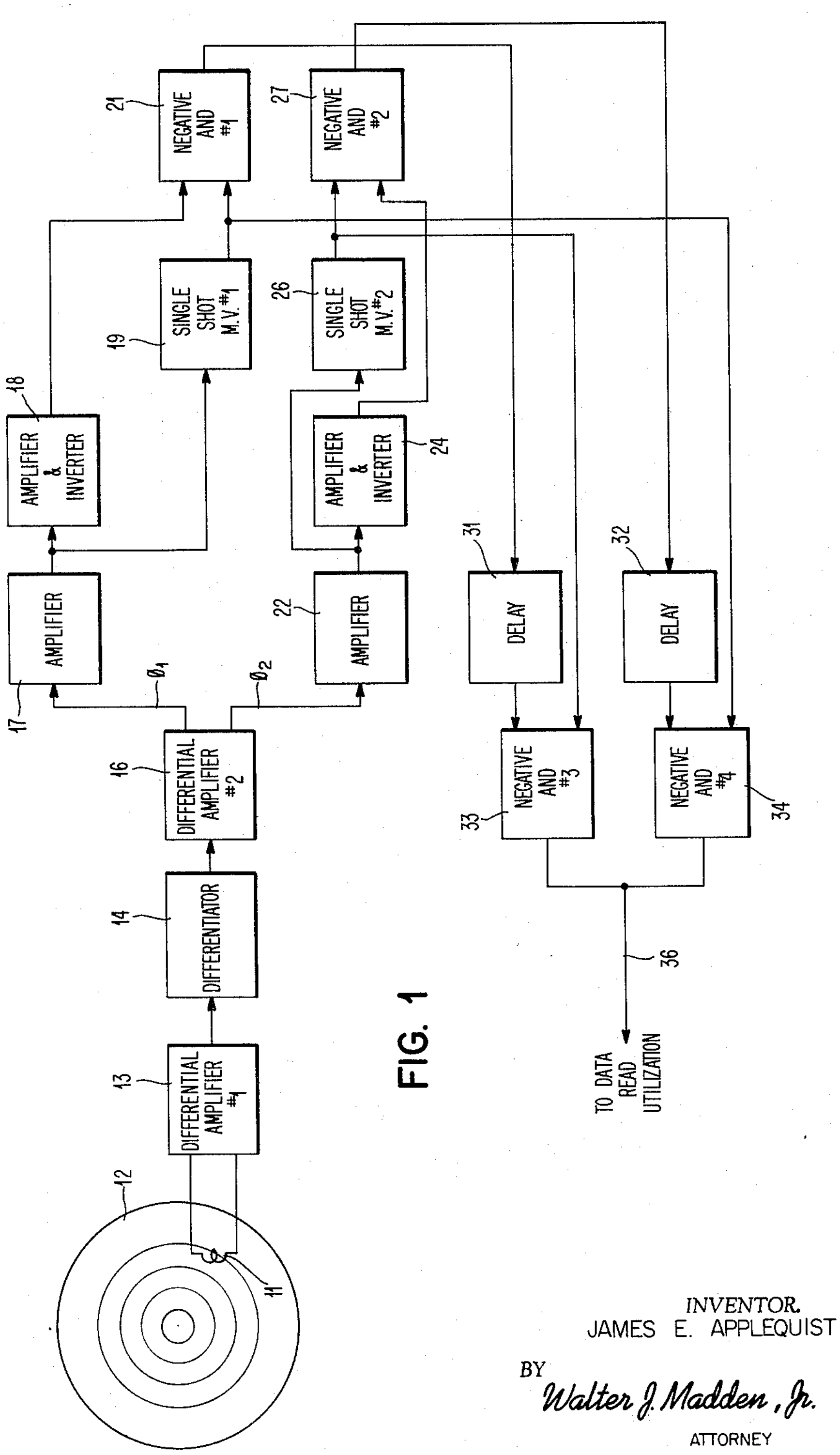

This invention relates in general to circuits for reproducing magnetically recorded digital information and relates more particularly to such circuits for extracting the digital information from the reproduced signal train.

In the modified NRZI system commonly used for magnetically recording digital data, a binary "1" is recorded by reversing the direction of magnetization of a recording surface which is moving relative to the recording head or transducer, while a binary "0" is recorded by not reversing the direction of magnetization. Thus the recorded signal consists of reversals in the direction of magnetization for each binary "1" bit on the surface. In reproducing this data, a voltage pulse is generated at the output terminals of a reading or reproducing head each time the head passes over a "1" bit or change in the direction of magnetization of the underlying surface, but no such pulse is generated by passage over a "0" bit, since there is no flux change for this bit.

After reproducing the signal train, it is necessary to extract therefrom the information by determining when the "1" bits have occurred. This detection is usually performed in conjunction with the clock circuit which samples the readback signal once per bit interval to determine whether the readback signal that bit interval corresponds to a binary "1" or a "0." In one commonly employed method of detection, known as "peak sensing," an effort is made to detect the peak of each of the pulses corresponding to binary 1's in the readback signal train. Usually this is done by first differentiating the readback signal to produce a signal train whose amplitude at each point is proportional to the rate of change of amplitude of the original readback signal. Thus, for a single positive-going readback pulse, the differentiated signal first rises to the maximum, then falls toward a negative maximum, and in so doing crosses zero amplitude at a time corresponding to the peak of the original input pulse. It then remains to sense the time instant at which the differentiated signal crosses the zero axis in order to establish a bit time which does not shift with amplitude variations of the input signal. It is the detection and noise separation circuitry, after the above differentiation of the input readback signal, to which the present invention is directed.

Broadly, the present invention contemplates a two-stage comparison in the detection operation to eliminate spurious noise pulses which may be present in the readback signal train. In accordance with this invention, in the first comparison a signal gate is formed for each half cycle of the differentiated signal corresponding to a single pulse in the readback signal. (It will be recalled that each single pulse in the readback signal, when differentiated, produces a full cycle pulse.) One gate circuit generates a gate signal each time the differentiated signal passes through zero from positive to negative, and an opposite gate circuit generates a gate signal each time the differentiated signal passes through zero from negative to positive. This gate signal is then gated with the squared or limited differentiated signal to produce an output pulse only when the amplitude of both of these signals are at or above a certain minimum value. This first comparison eliminates noise signals which have amplitudes less than the minimum level and which occur at times relatively far removed from "1" bits in the readback signal.

To eliminate noise signals of less than the minimum level which occur in close proximity to "1" bit signals, and which may pass through the gate generated by the "1" bit signal in the first comparison stage, a second comparison is performed as follows: The output pulses from the first comparison stage are delayed by a period corresponding to one-half cycle of the differentiated signal and are then compared with the gate from the opposite gate circuit which should have been generated during the second half cycle of the waveform. If such an opposite gate signal has been generated during this second half cycle, indicating that the pulse in the readback signal is probably a genuine "1" bit, the delayed pulse is gated through to the read data output circuitry. However, if no gate signal is generated by the opposite gate circuit during the second half cycle, indicating that there probably was no "1" bit occurring during this time, the delayed pulse is not gated through and is removed from the read data output circuit.

Figure 2:
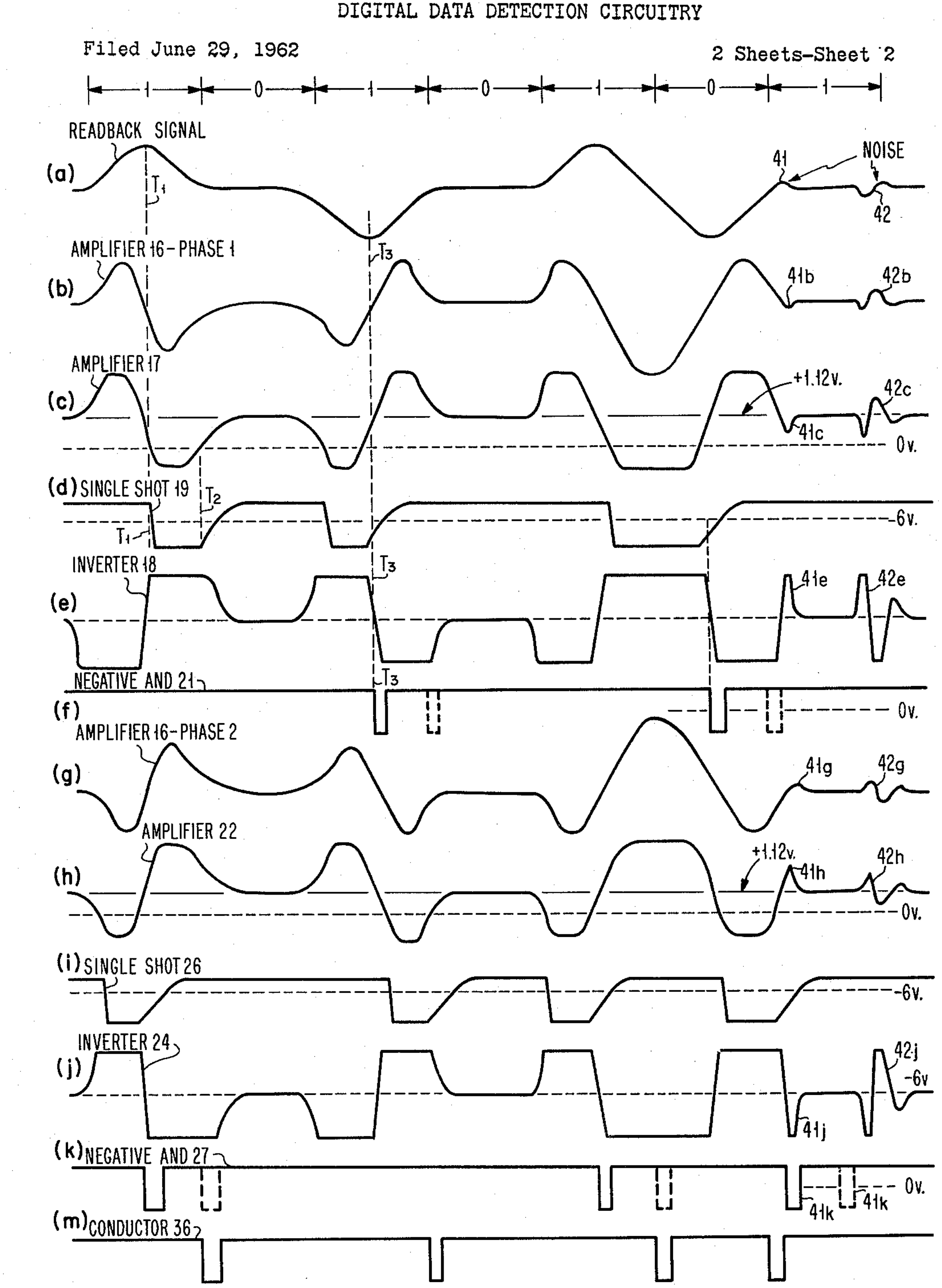

Objects and advantages other than those indicated above will be apparent from the following description when read in connection with the accompanying drawing, in which:

FIG. 1 diagrammatically illustrates one embodiment of the circuitry of the present invention; and FIG. 2 is a series of timing diagrams illustrating the relationships among the signals of the different circuit elements of FIG. 1.

Referring to FIG. 1 by reference character, number 11 designates a magnetic reproducing or reading transducer for reproducing magnetically recorded digital data from a cooperating magnetic record member. The record member may be of any suitable type, such as a magnetic disk 12 movable relative to transducer 11 and having a magnetizable coating on which data is recorded in concentric tracks. The voltage generated across the winding of transducer 11 as the recorded data passes this transducer is supplied to the input terminals of a first differential amplifier 13. Differential amplifier 13 may be a conventional two-stage direct coupled transitor amplifier with negative feedback provided by an RC combination. Negative feedback is preferably used throughout the amplifier, as is well known in the art, to stabilize the amplifier gain at a nearly constant value. the gain of this first amplifier 13 is preferably 16 and is constant to plus or minus 1% at 200 kc. Amplifier 13 is followed by a differentiating network 14 which may be an RC network with a small time constant to produce differentiation of the readback signal train at this point. The output from differentiator 14 is supplied to a second differential amplifier 16. Differential amplifier 16 produces two output signals, one of which corresponds to the differentiated output from differentiator 14 and identified as phase 1, and the other of which is 180 degrees out of phase with this phase 1 signal and is identified as phase 2.

At this point it may be convenient to consider the waveforms of FIG. 2 to understand the shapes of the signals discussed this far. FIG. 2(*a*) represents the readback signal train developed across transducer 11 as record medium 12 is moving relative thereto. From FIG. 2(*a*) it will be seen that the signal train has peaks therein corresponding to the binary "1's," as indicated above FIG. 2(*a*), while the signal is essentially flat during the bit intervals corresponding to binary "0's." The curve of FIG. 2(*b*) corresponds to the differentiated version of FIG. 2(*a*) and represents the output of differentiator 14 and the phase 1 output of differential amplifier 16. The phase 2 output from differential amplifier 16, which is the mirror image of the phase 1 signal, is shown in FIG. 2(*g*).

The phase 1 output from differential amplifier 16 is supplied to an amplifier 17 which further amplifies this signal and supplies it in parallel to the input of a single shot multivibrator 19 and a squarer or limiter and inverter circuit 18. Network 18 further amplifies, limits and inverts the signal received from amplifier 17 in order to steepen the leading edge of the differentiated bit pulses, since these are subsequently used to accurately establish the zero crossing time of each differentiated bit. The output of amplifier 17 is shown in FIG. 2(*c*), while the limited and inverted version thereof supplied from network 18 is shown in FIG. 2(*e*).

Single shot multivibrator 19 has circuit values and a supply voltage such that whenever the output of amplifier 17 crosses a reference potential of zero volts in a direction from plus to minus, the multivibrator is triggered. Thus, the output of multivibrator 19 produces a gate signal, as shown at time $T_1$ in FIG. 2(*d*). Multivibrator 19 remains in its triggered condition until the input voltage from amplifier 17 rises above zero volts, at which time the multivibrator 19 returns to its initial condition according to its internal time constant, as shown by the shape of curve 2*d* after time $T_2$.

The output from network 18 and the output from single shot multivibrator 19 are supplied as inputs to a negative AND gate 21. AND gate 21 produces a negative-going output signal during the time when the output of multivibrator 19 and the output of network 18 are both more negative than a suitable reference level, such as minus 6 volts. As shown in FIG. 2(*f*), AND gate 21 produces an output time $T_3$, and it will be seen that the leading edge of this output pulse from AND gate 21 coincides with the peak of the first negative-going "1" bit in the input signal of FIG. 2(*a*). It will be further noted that negative AND gate 21 produces an output pulse only for "1" bits of one polarity, the "1" bits formed by magnetization changes in the opposite direction being treated in a similar manner by a further portion of the circuit to be described now.

This further circuitry includes an amplifier 22 which receives the phase 2 output signal from differential amplifier 16, as shown in FIG. 2(*g*), and supplies it in parallel to an amplifier-squarer-inverter 24 and a single shot multivibrator 26. Single shot multivibrator 26, like multivibrator 19, has circuit values and a supply voltage such that whenever the output of amplifier 22 (FIG. 2(*b*)) crosses a reference potential of zero volts in a direction from plus to minus, the multivibrator is triggered. The output from multivibrator 26 is represented by the curve of FIG. 2(*i*).

The output from single shot multivibrator 26 and the output from network 24 (FIG. 2(*j*)) are supplied as inputs to a negative AND gate 27 similar to negative AND gate 21. Negative AND gate 27, like negative AND gate 21, produces a negative going output signal only when both the input from single shot multivibrator 26 and the input from amplifier inverter 24 are more negative than minus 6 volts. The output from negative AND gate 27 is shown in FIG. 2(*k*).

From the operation described thus far, it will be seen that each pulse appearing at the outputs of negative AND gates 21 and 27 is formed by a combination of a gate generated from the first half of the differentiated signal pulse and the squared differentiated signal itself. From an examination of the curves of FIG. 2, it will be seen that a gating pulse is generated by a single shot multivibrator 19 each time the differentiated output signal from amplifier 17 passes through zero from positive to negative, thus producing an output from multivibrator 19 for each negative-going half cycle of the differentiated signal of FIG. 2(*b*). Similarly, single shot multivibrator 26 produces a gating pulse whenever the differentiated output signal from amplifier 22 passes through zero from positive to negative. Since the signal from amplifier 22 is the inverted or mirror image version of the signal from amplifier 17, the result is that multivibrators 19 and 26 produce outputs for each half cycle of the differentiated readback signal.

It will be further seen that if each of the output pulses from negative AND gate 21 and 27 is delayed by an amount corresponding to approximately one-half cycle of the differentiated readback signal, the delayed output pulse should fall within the gate generated by the opposite single shot multivibrator. That is, the first negative going pulse in FIG. 2(*k*), representing the output of negative AND gate 27, when delayed by an amount corresponding to half a cycle of the differentiated wave of FIGS. 2(*b*) or 2(*g*), should fall within the gate generated by the opposite single shot multivibrator 19. In FIG. 2(*k*), this delayed position of the negative-going pulse from negative AND gate 27 is shown in dotted form immediately to the right of its original position, and it will be seen that this delayed pulse does occur within the gate generated by single shot multivibrator 19 as shown in FIG. 2(*d*). Similarly, the first negative-going output pulse from negative AND gate 21, as shown in FIG. 2(*f*), when delayed an amount corresponding to one-half cycle of the differentiated waveform and represented by the dotted outline in FIG. 2(*f*), falls within the gate generated by the opposite single shot multivibrator 26 as shown in FIG. 2(*i*).

The present invention utilizes such delay and subsequent comparison of the pulse with a gate generated in the opposite half cycle to insure detection only of pulses corresponding to binary "1's" in the readback signal. The desired delays may be achieved by any suitable means, such as a delay 31 connected to the output of negative AND gate 21 and a second delay 32 connected to the output of negative AND gate 27. The output of delay 31 is supplied as an input to a negative AND gate 33 which receives another input from the opposite single shot multivibrator 26. Similarly, the output from delay 32 is supplied as one input to a negative AND gate 34 which receives its other input from the opposite single shot multivibrator 19. The outputs from negative AND gates 33, 34 are supplied over a common conductor 36 to suitable circuitry (not shown) for utilizing the data pulses read.

The advantages of this delay and second comparison with a gate generated in the opposite half cycle may be clearly seen by considering two types of noise or unwanted signals which may be present in the readback signal. In FIG. 2(*a*), two noise pulses 41 and 42 are shown at the right hand portion of this curve immediately following a "1" bit and occurring during a "0" bit. The second noise pulse 42 is shown differentiated in FIG. 2(*b*) as noise 42*b*, and its form after amplification in amplifier 17 is shown as 42*c* in FIG. 2(*c*). From FIG. 2(*c*) it will be seen that the level of noise signal 42*c* is insufficient to cross the zero voltage level, so that no output is produced from single shot multivibrator (as shown in FIG. 2(*d*)) in response to noise pulse 42*c*. Noise pulse 42*c* is also supplied from amplifier 17 to amplifier 18 and inverted, amplified and limited, as shown by portion 42*e* of FIG. 2(*e*), and then supplied as one input to negative AND gate 21. However, negative AND gate 21 is not actuated by this noise pulse 42*e*, since AND gate 21 does not simultaneously receive a sufficiently negative signal from single shot multivibrator 19.

The original noise pulse 42 is also amplified and differentiated in the phase 2 signal as shown by portion 42*g* of FIG. 2(*g*). Noise pulse 42*g* is then amplified in amplifier 22, as shown at 42*h* in FIG. 2(*h*), and supplied to multivibrator 26. However, the amplitude of noise pulse 42*h* is not sufficiently negative to fire multivibrator 26, so that no output gate is produced from device 26, as shown in FIG. 2(*i*). The noise signal from amplifier 22 is also supplied to network 24 where it is limited and inverted to produce a signal as shown at 42*j* in FIG. 2(*j*).

This noise portion 42*j* is supplied as one input to negative AND gate 27, but AND gate 27 is not opened in response to this signal, since it does not simultaneously receive an input from the single shot multivibrator 26.

From the description so far it will be seen that the first comparison is sufficient to eliminate noise such as noise pulse 42, since this noise has an amplitude which is not sufficient to produce a gating pulse from either of multivibrators 19, 26, and the noise pulse is not sufficiently close in time to a "1" bit pulse to pass through a gate opened by that "1" bit pulse.

However, the type of noise represented by pulse 41 in FIG. 2(*a*) is more difficult to eliminate, since it appears in close proximity to a "1" pulse and consequently may fall within one of the gates generated by the differentiated "1" bit pulse. This is shown by noise pulse 41*g* in the phase 2 output from amplifier 16 of FIG. 2(*g*) which is amplified, limited and inverted in network 24 to produce the resulting noise pulse 41*j* in FIG. 2(*j*). Noise pulse 41*j* thus occurs within the gate period of single shot multivibrator 26 as represented in FIG. 2(*i*). Thus, the noise pulse 41(*j*) from amplifier 24 and the gating pulse from single shot multivibrator 26 coexist at negative AND gate 27 with the required zero value to open this gate and produce a negative-going output pulse indicated as 41*k* in FIG. 2(*k*).

If it were not for the delay and second comparison carried out in accordance with the present invention, this noise pulse 41*k* would pass through the detection circuitry and possibly be read as a "1" bit, thereby providing a spurious "1" bit signal in the data train. However, the delay and second comparison with the opposite gating signal in accordance with the present invention eliminate this noise pulse as indicated graphically as follows. Noise pulse 41*k* from AND gate 27 is supplied through delay 32 to produce a pulse represented by the dotted position 41*k'*. This delay pulse from delay 32 is supplied as one input to negative AND gate 34 which also receives an input from the opposite signle shot multivibrator 19 as represented in FIG. 2*d*. It will be seen that during the time interval corresponding to the delay noise pulse 41*k'*, multivibrator 19 does not produce a gating signal, since there is no corresponding half cycle in the differentiated signal of FIG. 2(*c*) having an amplitude sufficient to trigger multivibrator 19 and generate such a gating signal. Thus, negative AND gate 34 is not opened when the delayed noise pulse 41*k'* arrives thereat and hence this delayed noise pulse does not pass through gate 34 to the data read utilization conductor 36. As indicated in FIG. 2(*m*,) the resultant output to the data read utilization conductor 36 comprises pulses corresponding to genuine "1" bit pulses in the readback signal, with the spurious noise pulses 41, 42 eliminated therefrom.

From the preceding description it will be seen that the only unwanted signals which can pass through the system are those with peak amplitudes greater than 1.12 volts at the output of either amplifier 17 or 22, since this is the level at which the zero signal level is set, and this reference level of 1.12 volts is therefore the level of resolution between signal and noise. This level represents the minimum level of signal which may pass through and likewise represents the maximum noise level which can be tolerated. There is, of course, a slight margin of tolerance about this level, so that the actual ratio of minimum signal to maximum noise at this point is 1.3-to-1. High frequency noise in the system is preferably eliminated by limiting the band pass of amplifier 13 to 1 megacycle and limiting the band pass after differentiator 14 to 1.5 megacycles.

While the invention has been particularly shown and described with reference to a preferred embodiment thereof, it will be understood by those skilled in the art that various changes in the form and details may be made therein without departing from the spirit and scope of the invention.

I claim:

1. Apparatus for detecting the presence of binary signals in an electrical signal train from a magnetic reproducing element, said binary signals being represented in said signal train by pulses of one or the other polarity, comprising means for differentiating said signal train to produce a differentiated signal train in which each of said pulses representing one of said binary signals appears as a full cycle signal having a zero crossing point correspondding to the peak of said binary pulse, means for generating a gate pulse for each half cycle of each said full cycle signal in said differentiated signal train, means for squaring said differentiated signal train, first comparing means for comparing said gate pulse for each half cycle with said squared signal train to produce a first compare pulse only when the amplitudes of said gate pulse and said squared signal have a predetermined relationship, delay means for delaying said first compare pulse, and second comparing means for comparing said delayed compare pulse with said gate pulse generated during the opposite half cycle of the differentiated signal train to produce an output pulse from said second comparing means only when said gate pulse exists during said opposite half cycle.

2. Apparatus in accordance with claim 1 in which said delay means has a period corresponding to one half cycle of said full cycle signal.

3. Apparatus in accordance with claim 1 in which said first compare pulse is generated only when the amplitudes of said squared signal train and said gate pulse simultaneously have a predetermined negative value.

4. Apparatus for detecting the presence of binary signals in an electrical signal train from a magnetic reproducing element, said binary signals being represented in said signal train by pulses of one or the other polarity, comprising means for differentiating said signal train to produce a differentiated signal train in which each of said pulses representing one of said binary signals appears as a full cycle signal having a zero crossing point corresponding to the peak of said binary pulse, means for inverting said differentiated signal train, means for generating a gate pulse for each negative half cycle signal in said differentiated signal train, and in said inverted differentiated signal train, means for squaring said differentiated signal train and said inverted differentiated signal train, first comparing means for comparing each of said gate pulses for each negative half cycle of said differentiated signal and said inverted differentiated signal train with the corresponding squared signal train or with said squared inverted signal train to produce a first compare pulse only when the amplitudes of said compared gate pulse and said squared signal train have a predetermined relationship, delay means for delaying said first compare pulse, and second comparing means for comparing said delayed compare pulse with said gate pulse generated during the opposite half cycle to produce an output pulse from said second comparing means only when a gate pulse exists during said opposite half cycle.

5. Apparatus in accordance with claim 4 which said delay means has a period corresponding to one half cycle of said full cycle signal.

6. Apparatus in accordance with claim 4 in which said first compare pulse is generated only when the amplitudes of said compared gate pulse and said squared signal train simultaneously have a predetermined negative value.

No references cited.